Sept. 28, 1943.　　　K. O. TOOKER　　　2,330,762
MOLDING MACHINE
Filed June 6, 1941　　　4 Sheets-Sheet 1

INVENTOR
Kenneth O. Tooker
BY
Harry S. Demarsr
ATTORNEY

Sept. 28, 1943.    K. O. TOOKER    2,330,762
MOLDING MACHINE
Filed June 6, 1941    4 Sheets-Sheet 2
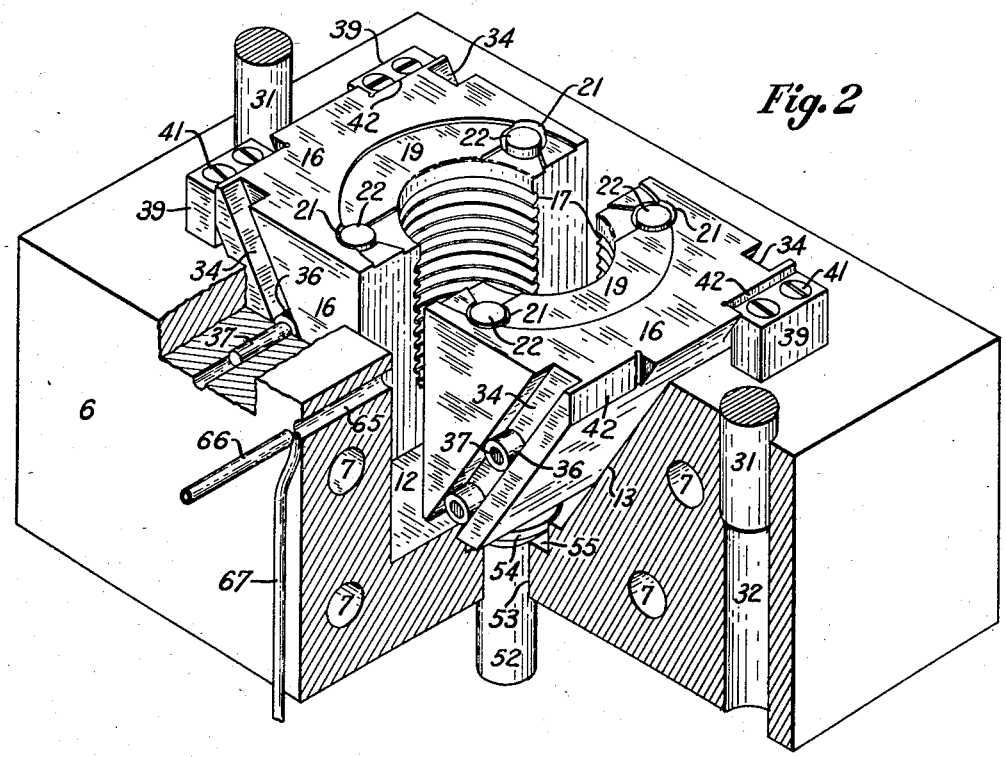
Fig. 2
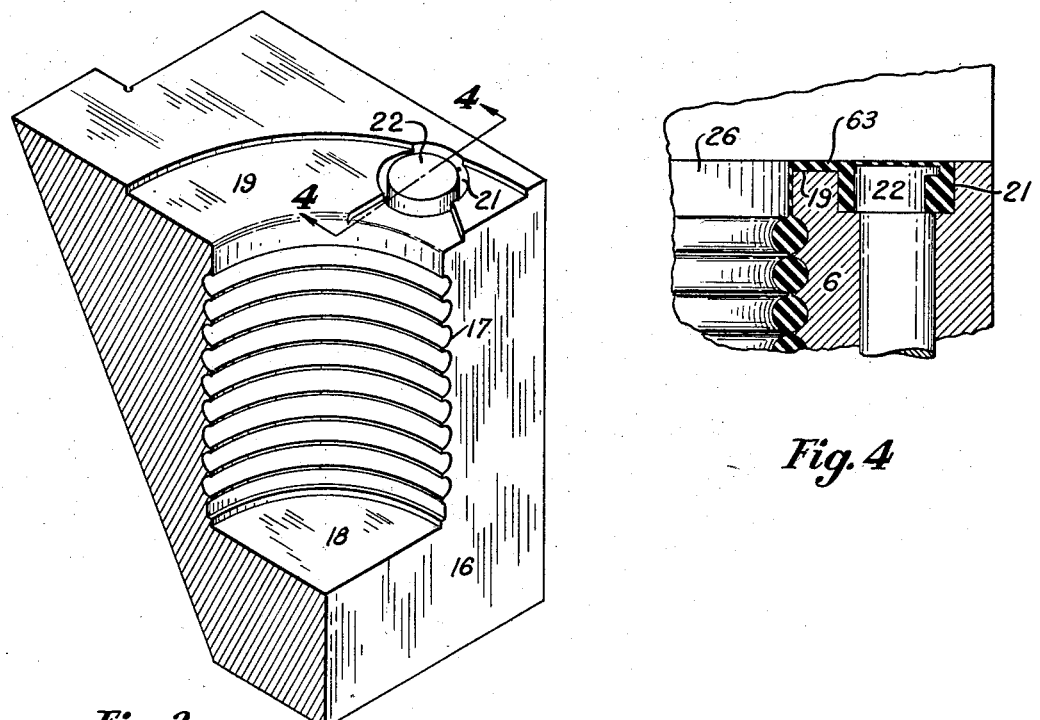
Fig. 3
Fig. 4
INVENTOR
Kenneth O. Tooker
BY
Harry S. Bennett
ATTORNEY Sept. 28, 1943.   K. O. TOOKER   2,330,762
MOLDING MACHINE
Filed June 6, 1941   4 Sheets-Sheet 3

INVENTOR
Kenneth O. Tooker
BY
Harry S. Dunesse
ATTORNEY

Sept. 28, 1943.  K. O. TOOKER  2,330,762
MOLDING MACHINE
Filed June 6, 1941  4 Sheets-Sheet 4

INVENTOR
Kenneth O. Tooker
BY
ATTORNEYS

Patented Sept. 28, 1943

2,330,762

UNITED STATES PATENT OFFICE 2,330,762

MOLDING MACHINE

Kenneth O. Tooker, Detroit, Mich., assignor to The Hoover Company, North Canton, Ohio, a corporation of Ohio Application June 6, 1941, Serial No. 396,799

13 Claims. (Cl. 18—17)

The present invention relates to molding machines and more particularly to improvements in the field of molding rubber articles. More specifically the invention comprises a machine and a method by which rubber belts or similar articles may be made more simply and with greater speed than heretofore.

The molding of rubber articles is today a field of great importance and activity. Included in this field are rubber belts which are useful in many connections and particularly for the purpose of power-transmission. These belts may be made in various sizes and shapes but are usually circular, round or elliptical in cross-section. They find a particular use in suction cleaners in which power is transmitted from the driving motor shaft to a rotating agitator positioned within the cleaner nozzle.

Heretofore it has been the practice in making rubber belts and similar articles to mold these items singly, that is, one to a cavity. A plurality of mold cavities might be synchronously operated but only a single belt would be formed in each cavity. Possibly as many as twelve or thirteen individual mold cavities can be operated in a single molding press but the number is limited by the platen area required for the side-by-side arrangement of the cavities. Belts made in this manner have individual flashings which represent a waste of rubber and which must be removed from the belts before they can be sold and placed into operation. Also the operating of the molding machine itself is relatively expensive as there are a multiplicity of individual cavities to be cared for and cleaned. This relatively slow and expensive process of manufacturing belts has in the past restricted their speed of production and held their selling price at an unduly high level.

In the molding machine of the present invention the disadvantages which have characterized the former machines and methods have been substantially eliminated. A plurality of belts are formed and made in a single mold and, as there may be substantially as many molds operated by each molding press as in the former methods, the number of belts produced in each operation is multiplied many times. The waste material represented by the flashings is reduced by the present method to a small fraction of that of the former method. The rubber in the molding process is caused to flow differently than in the previous methods used and the product which is formed has superior characteristics and because of the speed of operation and making can be sold for a lesser price.

It is an object of the invention to provide a rubber belt-molding machine in which a single charge of rubber compound is formed into a plurality of adjacent circular belts by the use of a single force plug from which the belts are stripped upon the opening of the mold. A still further object of the invention is to provide a mold for rubber articles in which a two part outer mold element is laterally separable and a force plug moves longitudinally relative thereto, the outer mold element being formed to retain the product and to strip it from the force plug in the opening of the mold. A still further object of the invention is to provide a molding machine in which a plurality of molds each forms a cluster of belts. These and other more specific objects will appear upon reading the following specification and claims and upon considering in connection therewith the attached drawings to which they relate.

Referring now to the drawings in which a preferred embodiment of the present invention is disclosed, and in which the same reference character refers to the same parts in the various views:

Figure 2 is an isometric view, partly in section, which shows the separable outer mold element movably positioned in the lower steam plate in the open position;

Figure 3 is an isometric view of a segment of the mold and illustrates a retention recess and stud provided to receive excess rubber from the mold proper the purpose of which is to form such rubber into retaining means for the belt cluster when the force plug is separated;

Figure 4 is a section upon the line 4—4 of Figure 3 and illustrates the manner in which the surplus rubber encloses the retaining stud;

Figure 1:
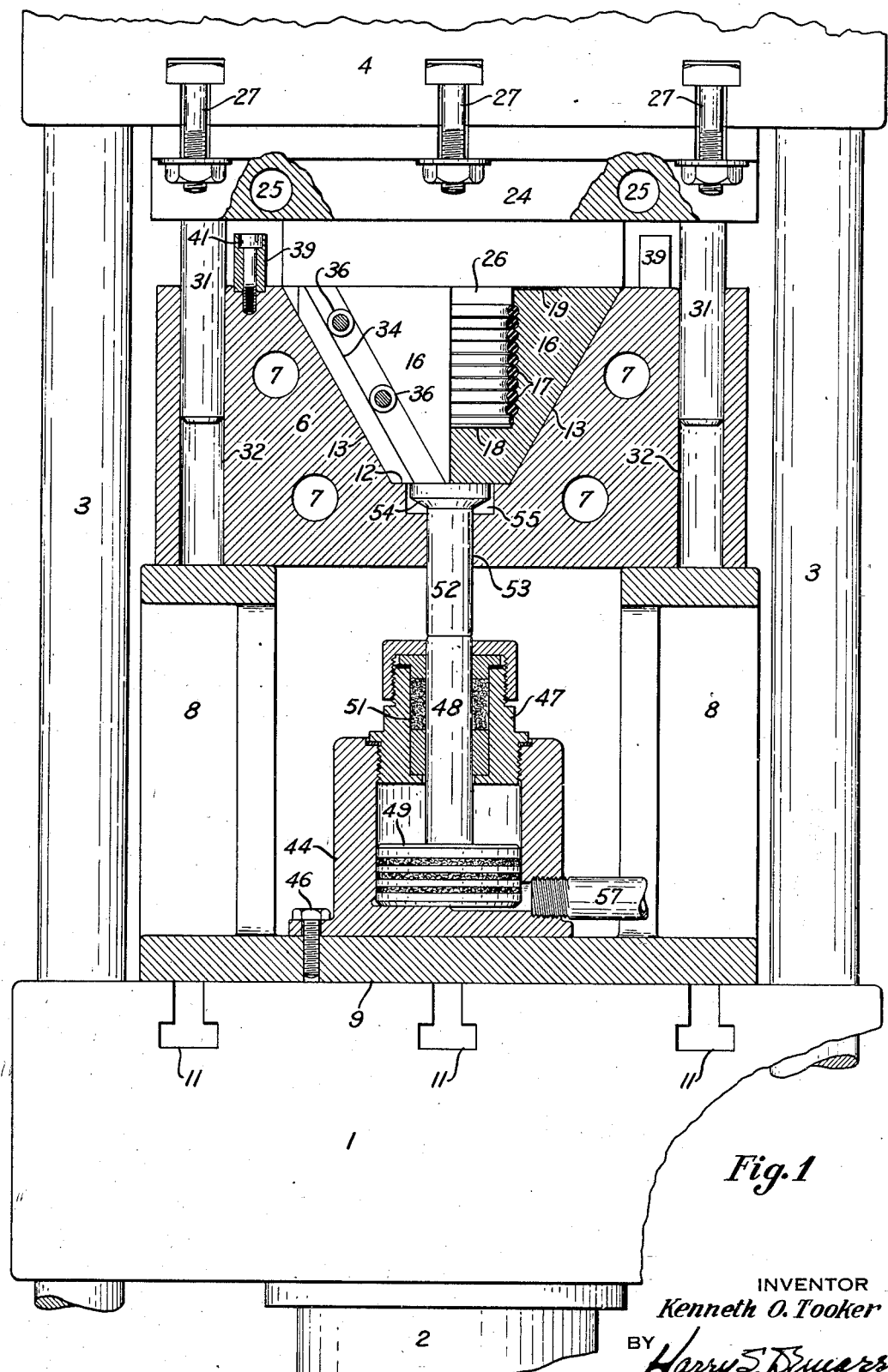
Figure 1 is a vertical cross section through a single mold positioned in a rubber molding press.

In the embodiment of the invention illustrated in the drawings a single unit of a rubber molding press is indicated but it is to be understood that a plurality of such units comprise the entire press, and that the unit disclosed is illustrative of each of the individual units. In the drawings the reference character 1 indicates the platen which supports a plurality of the molding units which are constructed as hereinafter described. Platen 1 is an enlarged flat topped table which is supported by an hydraulic lifting mechanism of any suitable type the vertical plunger 2 of which is seen to be positioned immediately thereunder. A plurality of vertical guide posts 3 direct the platen 1 in its vertical movement toward and from the top platform or platen 4 which carries, as will be hereinafter set forth, a part of the mold which cooperates with the mold element carried by the platen 1.

A steam plate 6, formed with steam-conducting passageways 7, is carried by platen 1 by the spaced vertically-extending side arms 8 of the support 9, the latter being secured to the top of the platen 1 by a tongue and groove relationship illustrated at 11. The steam plate 6 is formed with an upwardly facing recessed mold seat indicated at 12, the bottom and side walls of which extend horizontally and vertically, respectively, while the end walls thereof are inclined, as indicated at 13, to form diverging guide surfaces for a purpose which will be hereinafter disclosed.

A two piece outer mold member, the parts or sections of which are indicated by the reference character 16, is positioned within the mold seat 12 and is formed with exterior surfaces which exactly conform to the bottom and side walls of the mold seat so that it is adapted to fit snugly therein. Sections 16 make contact along a dividing vertical plane and in their closed position form a cylindrical recess the sides of which are corrugated by a plurality of circumferential channels each of which is semi-circular in cross section, as indicated at 17, and which are separated by extremely small distances. A flat bottom surface 18 is spaced somewhat from the lowermost channel 17 and the uppermost channel is spaced somewhat below the top of the mold member. Each mold section is formed with a shallow rim-like recess 19 surrounding the top of the main cylindrical recess for the purpose of receiving the overflow of surplus material which is known as the "flash." At spaced intervals circumferentially of this rim-like recess 19 are deeper recesses 21 upwardly within each of which projects a button-like stud 22 formed with an overhanging lip portion at its upper edge. Recesses 21 are adapted to be filled by the overflow rubber or flash to form retaining means which at a later stage in the operation of the press will function to hold, at least temporarily, the molded objects to the outer mold member.

An upper steam plate 24, provided with steam passageways 25, carries a cylindrical force plug 26 and is fixedly secured, as by means of bolts 27, to the upper platen 4. Force plug 26 is adapted to fit between the mold sections 16 and is provided with identical semi-circular channels, here indicated by 29, which in each instance are adapted to oppose and cooperate with one of the channels in the outer mold member to form a circular passageway which is also circular in cross section. The plug fits within the mold section 15 and other than at the aforementioned channels and at the rim-like recess 19 there is but very slight clearance, about 1/64 inch, between the plug and the outer mold member at any point. Being carried by the upper steam plate 24, which is itself carried by the fixed upper platen 4, the force plug 26 is a fixed element in each instance. To insure that the plug will at all times be in exact alignment with the cylindrical recess cooperating outer mold member, which is mounted for vertical displacement with the steam plate 6, there are provided a plurality of vertically extending guide posts 31 which extend downwardly from the upper steam plate and pass slidingly through vertical bores 32 in the lower steam plate 6.

While it is clear that the vertical displacement of the lower steam plate 6 together with the mold sections 16 will move the outer mold sections 16 from the upper force plug 26, it is also clear that if the mold cavities are filled with solid material that such displacement without shearing will not be possible. Accordingly, it becomes necessary that the outer mold be opened in the sense of expanded or outwardly withdrawn before such displacement takes place. To permit of lateral movement of the mold sections 16 there is provided on each side of each section an inclined guideway 34 which extends parallel to the sloping end walls 13, 13 of the steam plate 6. Within each channel 34 is positioned a pair of supporting rollers 36 each of which is carried upon a stud 37 fixedly carried in the adjacent wall of the steam plate. The relationship is such that if the steam plate 6 is moved downwardly and the mold sections 16 are held in place, the mold sections 16 are moved apart transversely and, in effect, slide along the outer sloping end walls 13 of the steam plate although in fact they are guided and carried by the rollers 36. This is exactly the operation which takes place in the expansion of the outer mold member. To limit the vertical movement between the mold sections 16 and the steam plate 6 there are provided a plurality of stops 39 which are secured to the upper face of the steam plate 6 by screws 41 and so arranged as to abut vertical shoulders 42 at the outer corners of the mold sections 16 in the uppermost positions of the sections relative to the plate.

In order to obtain the expanding or spreading action of the mold sections 16 which will enable the force plug 26 to be withdrawn after the molding operation is completed, there is provided means which will hold sections 16 against downward vertical movement with the steam plate 6 during the initial one and one-half inches of movement of the plate which will enable the guideways and rollers 34 and 36, respectively, to effect the expansion. This mechanism is carried by the support 9 upon the platen 1 and includes a cylindrical casing 44 secured by suitable bolts 46 to the support. The upper end of the cylinder 44 is suitably closed by a cylinder head 47 which slidingly seats a plunger 48 connected to a piston 49 within the cylinder 44. Suitable seals 51 carried by the head 47 prevent leakage through the cylinder head. A second plunger 52 seats upon the top of plunger 48 and extends slidingly through a bore 53 in the steam table 6, being provided with an enlarged flat topped head 54 which is positioned within a sump 55 in the bottom face of the mold seat 12 in the steam table 6. A fluid conduit 57 connects to the lower end of the cylinder 44 and is adapted to convey fluid under pressure thereto which will drive the piston 49 upwardly within the cylinder.

The structure necessary to mold one cluster of belts has now been described with but a slight exception. One or more jet openings 65 are positioned in the side wall of plate 6 so that it faces the space between the outer mold sections 16 in the open relationship. A lubricant passes through the jet under the force of a carrying stream of air from a pipe 66 which aspirates the lubricating material from the feed line pipe 67. As will be explained this lubrication assists in the removal of the belt cluster from the mold.

It is to be understood that it is exemplary and that a plurality of such units are adapted to be actuated in the same press, that is, a plurality of belt clusters can be molded by similar molds positioned between the lower movable platen 1 and the upper stationary platen 4 of the press.

Figure 5:
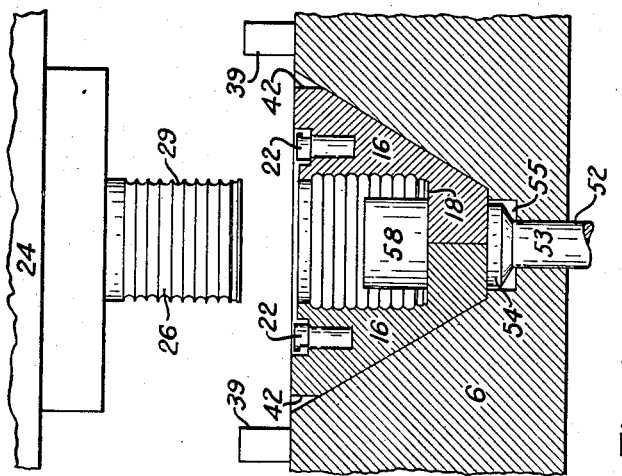
Figure 5 illustrates the first step in the process of forming a new belt cluster with the rubber compound positioned in the mold and the force plug ready to advance therein.

The operation of the device constructed in accordance with the invention will now be disclosed and is as follows, reference being made particularly to Figures 5 to 9 of the drawings. A cylindrical block 58 of the rubber compound formed of the desired ingredients is placed upon the bottom face 18 of the closed outer mold member, the sections 16 of which are in abutment as illustrated in Figure 5. The lower mold member is spaced downwardly from the upper force plug 26 but steam passes through the upper and lower plates and the mold and the force plug are at high molding temperatures.

Figure 6:
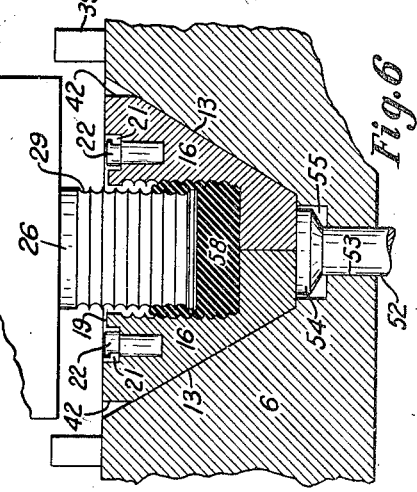
Figure 6 is a showing of the mold partly closed and illustrates the manner in which the charge is forced upwardly between the force plug and the two piece outer mold member.

In the first step of the operation the lower platen 1 is raised by the hydraulic plunger 2 of the press carrying with it in its vertical travel the steam plate 6 and the outer mold sections 16. The exact alignment between the force plug and the lower outer mold member is maintained by the vertical guides 31 which pass downwardly in their guideways 32 in the steam table 6. Likewise the upward movement of the lower platen 1 is guided by the vertical guides 3. The force plug 26 enters the recess formed by the mold sections 16 as illustrated in Figure 6 and makes contact with the block of compound indicated at 58. Immediately that material is placed under pressure and is forced transversely and travels upwardly between the force plug and the mold sections 16 as illustrated in Figure 6. This flow of the material continues until the force plug has extended its full length into the outer mold and the lower flat face of the steam table 24 has abutted top face of the mold sections 16 at which time the only escape for the overflow rubber is between the abutting faces in the rim recess 19. Through this and into this rim recess flows all the excess rubber to form a flash. As the rim leading immediately to the recesses 21 is somewhat deeper, a large part of the overflow rubber flows into those pockets and about the retaining studs 22. The amount of rubber compound 58 which was placed into the mold was predetermined so as to fill all of the cavities with but very little overflow but, as is well known, any excess material will force its way between metallic parts even though they are in close contact. Accordingly, after the product has been formed any excess material will flow and escape between the abutting top surfaces.

Figure 10:
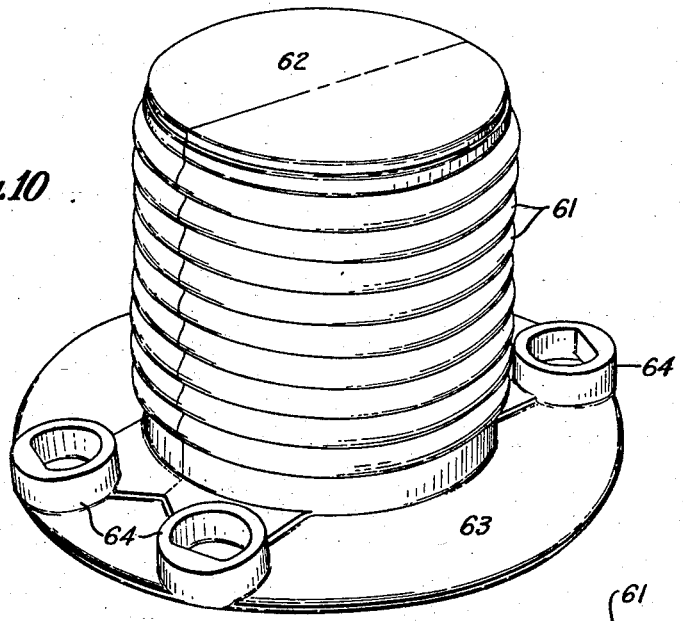
Figure 10 is a view of the finished cluster of belts as taken from the mold without being turned inside out.
Figure 11:
Figure 11 is a view in perspective of a single belt made in accordance with this invention.

With the force plug 26 advanced into the mold for its full length the space between the parts is indicated by the product shown in isometric view in Figure 10. The cooperating channels 17 in the outer mold sections 16, and 29 in the force plug 26, have formed a stack of circular rubber belts 61 which may be referred to as a cluster, one of the belts of which is illustrated in Figure 11. The belts of the cluster are interconnected by narrow thin webs or flashes. At the inner or lower end a flash 62 is formed between the bottom of the force plug and the bottom wall 18 of the mold sections 16 while at the outer or upper end a rim-like flashing 63 is formed from which extend a plurality of hollow protuberances 64 of the exact size and shape of the space between the recesses 21 and the button-like plugs 22 therein. In the mold the belt cluster as illustrated in Figure 10 is inverted, that is, the flash 63 is at the top while the flash 62 is at the bottom.

After the mold parts have been in a closed relationship for some ten minutes at a temperature of approximately 302 degrees Fahrenheit the rubber belt cluster is sufficiently cured and the mold is ready to be opened.

Figure 7:
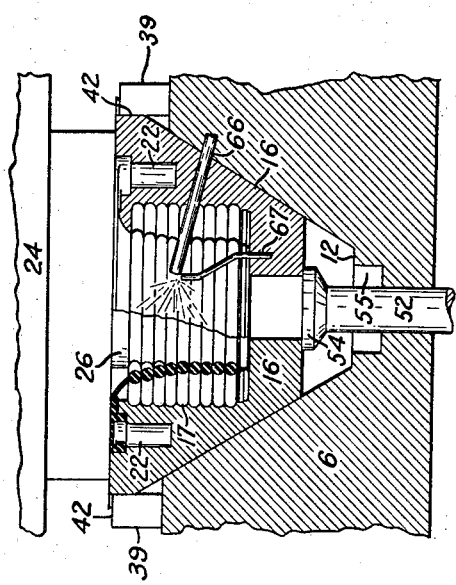
Figure 7 illustrates the first step in the opening of the mold, the steam plate supporting the outer mold member having moved downwardly while the outer mold itself has only expanded laterally.

The first step in the operation of opening the mold is illustrated in Figure 7. The lower platen 1 begins its downward movement and carries with it the steam plate 6 and the cylinder or casing 44 of the auxiliary hydraulic lifting mechanism. Fluid under pressure is admitted into the cylinder 44 through the conduit 57 in the auxiliary lift and a pressure is exerted upon the piston 49 which forces it upwardly and so exerts a pressure through the plungers 48 and 52 upon the flat topped head 54 of the upper plunger. This latter element abuts the flat bottom face of both of the outer mold sections 16 and forces them against the bottom face of the steam plate 24 which carries the force plug 26. The result is that as the steam plate 6 moves downwardly the piston 49 moves upwardly under the pressure exerted thereon and holds the mold sections 16, 16 in place. As the steam plate 6 moves downwardly relative to the mold section 16, however, the supporting rollers 36 move downwardly in their channels 34 and, in an obvious manner, force the sections 16, 16 apart. This relative movement between the mold sections 16 and the steam plate 6 continues for approximately one and one-half inches of plate travel at the end of which the mold sections 16 have advanced until their abutment shoulders 42 have contacted the stops 39. This relationship is illustrated in Figure 7 and it is clear that in such relationship the recesses 17 are spaced entirely from the belt cluster which encloses and is carried by the force plug 26.

Figure 8:
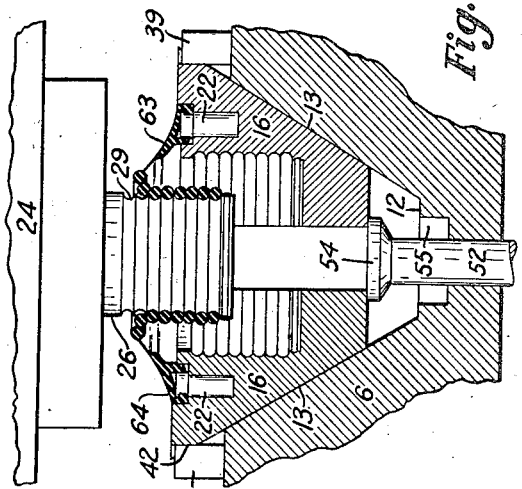
Figure 8 illustrates the molding operation at a later stage in which the two part outer mold member has moved downwardly with the lower steam plate and the force plug is displaced therefrom, the belt cluster starting to strip from the force plug under the retaining action of the button-like studs.

In the third step of the opening operation, as illustrated in Figure 8, the outer mold section 16 moves downwardly with the steam plate 6. The upper flash 63 is held in place by its interlocking relationship with the button-like studs 22 and the belt cluster begins its stripping movement from the force plug 26. Actually the upper flash rim 63 draws the upper belt of the cluster down and over the lower belt and reverses the entire cluster inside out. To facilitate this inversion and to reduce the friction of the sliding contact there are provided, as described, one or more lubricating jets 65 through which air under pressure from a feed line 66 exhausts a lubricating fluid, such as glycerine and water, lifted by an atomizing action through a feed line 67. The jet opening 65 is so positioned and directed as to spray upon the surface of the belt cluster so that in the reversal and turning movement the belt cluster will slide upon itself with a minimum of friction thereby preventing tearing.

Figure 9:
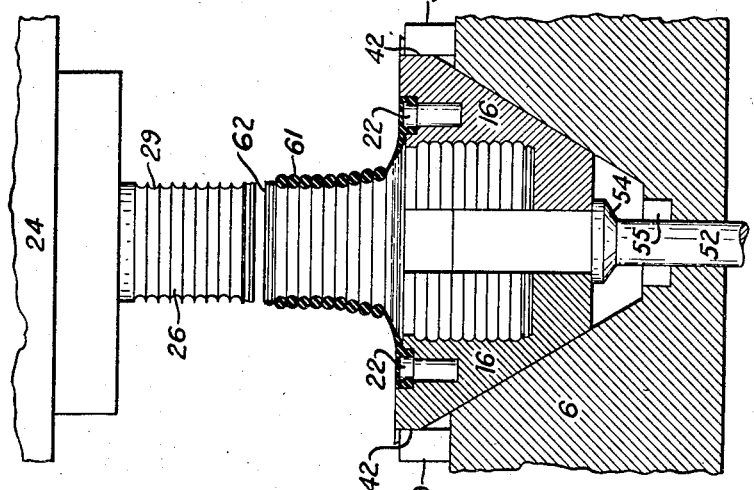
Figure 9 is a view of the final step with the press completely opened and the force plug withdrawn entirely from the mold, the belt cluster being turned inside out and removed entirely from the force plug.

In the final step of the action the force plug 26 is withdrawn entirely from the belt cluster which has been turned inside out, as illustrated in Figure 9. The cluster continues to be carried by the lower outer mold member through the retention action of the rim 63 with the button-like plugs 22. From this position it is readily displaced manually by an operator, however, who will lift one corner of the rim and detach it from the plug.

It is believed to be clear that a plurality of such units can be made in a single press in accordance with the method which has just been described in connection with the formation of a single belt cluster, it being necessary only that the mechanism which has been described for a single unit be mounted between the upper and lower platens 1 and 4 of the same press.

Figure 12:
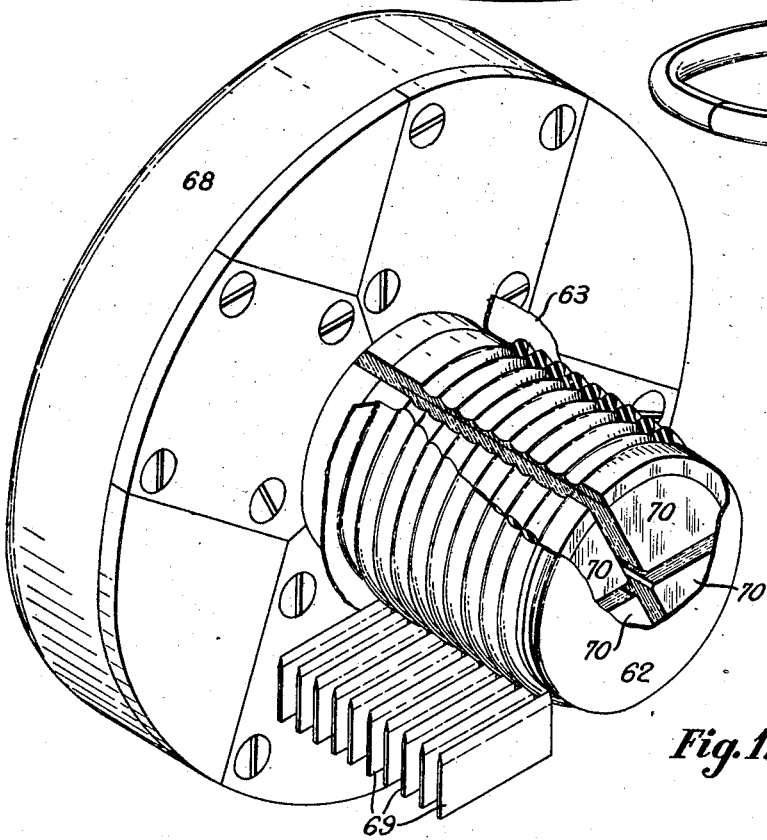
Figure 12 illustrates the method of separating the individual belts of the cluster by rotating them upon a mandrel in contact with cutting edges.

Upon the belt cluster being removed from the mold it is desirable that the cluster be separated into individual belts and the end flashes cut away. This is accomplished by sliding the jaws 70 of an expansible mandrel 68 into the cluster and then expanding the jaws, as illustrated clearly in Figure 12. The outer surfaces of the jaws are made to conform to the contours of the belts and the cluster is securely fixed in place. The mandrel 68 is then rotated in contact with a gang cutter comprising a plurality of blades 69 which blades sever the flashes between the individual belts and the end flashes immediately adjacent the outer belts. This operation takes but an instant and thereafter the collapse of the jaws 70 permits the belts to be removed axially of the jaws and each belt has the appearance illustrated in Figure 11. The very small flash which forms a part of each belt at the side thereof is of such small extent as to be inconsequential and no steps need be taken to remove it. It is interesting to note that in the belt constructed in accordance with the present invention the flash appears at the side of the belt whereas in belts constructed heretofore the flashing appears upon the inside and upon the outside thereof.

In constructing belts in clusters in accordance with the present invention there are numerous advantages. Less rubber is wasted in flashes for instead of having flashes upon nine separate belts there are only two flashes of consequence which appear at the top and the bottom of the clusters and which contain much less rubber than the flashes which have resulted from nine separate belts as heretofore made. There is also a saving in the time of the operator for he needs but to place a single charge to make nine belts where heretofore it has been necessary for him to place charges in nine molds. Likewise time is saved in the cleaning of the molds. There is additional saving of time in the trimming operation to remove the flashes for nine belts can be trimmed in a single operation whereas heretofore the belts of necessity were trimmed singly. One very important improvement and saving lies in the fact that with a given platen area in a press a greater number of belts can be produced than by conventional production methods. There is also saving of time in the preparation of the initial charge for only one large charge is necessary for a plurality of belts rather than individual charges for each belt. There are numerous other advantages which accrue from the present invention but from the foregoing it is believed that it is apparent that the advantages which are gained are extremely important.

I claim:

1. A molding machine including two relatively movable supporting platens, cooperating interfitting mold elements carried by said platens for movement toward and from each other, one of said elements being recessed and the opposing element upon the opposite plate having a projection, said mold elements being so constructed and arranged that with said platens in close proximity said projection element extends into said recessed element, said recessed element being expansible laterally of the direction of movement of said elements toward and from each other, means to vary the distance separating said platens and so said mold elements, and means to expand said recessed mold element laterally of the direction of movement of said platens during the initial separating movement thereof and prior to separation of said projection element from said recessed element.

2. A molding machine including two relatively movable supporting platens, cooperating interfittting mold elements carried by said platens for movement toward and from each other, one of said elements being recessed and the opposing element upon the opposite plate having a projection, said elements being so constructed and arranged that with said platens in close proximity said projection element extends into said recessed element, said recessed element being formed of a plurality of parts displaceable laterally relative to the direction of movement of said mold elements toward and from each other, and means movable with the platen carrying said recessed element to displace said parts laterally during an initial opening movement of said last-mentioned platen and prior to separation of said projection element from said recessed element.

3. In a molding machine, a first platen, a second platen, means to move said second platen toward and from said first platen, a force plug carried by said first platen, an outer mold member comprising a plurality of individually movable parts, means mounting said outer mold member on said second platen for synchronous longitudinal and lateral movement of the individually movable parts thereof relative to said second platen, means to hold said outer mold member carried by said second platen against longitudinal displacement of said mold during the initial longitudinal displacement of said second platen from said first platen, and means to effect the lateral movement of said individually movable parts of said outer mold member during said initial longitudinal displacement of said second platen.

4. In a molding machine, a first platen, a second platen, means to move said second platen toward and from said first platen, a force plug carried by said first platen, an outer mold member comprising a plurality of individually movable parts, guide means mounting said parts relative to said second platen to produce an opening and closing of said outer mold member upon the movement of said second platen and means to hold said outer mold member against displacement relative to said force plug during an initial movement of said second platen from said first platen whereby said guide means effect an opening of said outer mold member, said last mentioned holding means comprising an auxiliary hydraulic lift of restricted displacement movable with said second platen.

5. In a molding machine, a first steam plate, a force plug carried thereby, a second steam plate, an outer mold member carried by said second steam plate comprising a plurality of individual parts adapted to form a receptacle for said force plug in their assembled relationship and formed with a flash-receiving channel around their upper extremities, said channel being formed with a plurality of deeper pockets in which are positioned retaining plugs, means to move said steam plates together to position said force plug within said outer mold member and to move said steam plates apart, and means to move said individual parts laterally from said force plug upon separation of said steam plates, said retaining plugs functioning to retain a molded product on said outer mold member and to draw it from said force plug.

6. In a molding machine, a first steam plate, a force plug carried thereby, a second steam plate, an outer mold member carried by said second steam plate comprising a plurality of individual parts shaped to form in the assembled condition a recess for said force plug, an overflow channel at the side of said outer mold member including means to receive overflow from the mold and to retain it against a tension exerted by the force plug on the molded article, means to move the steam plates and so the force plug and the outer mold member toward and from each other, and means connected to one of said steam plates to spread the individual parts of said outer mold member prior to movement thereof with said second steam plate.

7. A molding machine including two work-carrying platens, a mold element carried by each of said platens arranged and constructed for nesting in certain relative positions of said platens, means for moving one of said platens toward and from the second platen, the mold element carried by said one platen comprising a plurality of individually movable parts, and means to move said parts laterally relative to the direction of movement of said one platen during the initial movement of said one platen from said second platen including an auxiliary pressure-actuated lift carried by said one platen which holds said mold element, comprising a plurality of individually movable parts against displacement by said one platen during the initial stage of its movement from said second platen.

8. A molding machine including two work-carrying platens, a mold element carried by each of said platens arranged and constructed for nesting in certain relative positions of said platens, means for moving one of said platens toward and from the second platen, the mold element carried by said one platen comprising a plurality of individually movable parts, and means to move said parts laterally relative to the direction of movement of said one platen during the initial movement of said one platen from said second platen including means mounting the individually movable parts of the mold element on said one platen for lateral displacement upon being moved relative to said one platen in the direction of movement of said platen, and also means to hold said individually movable parts against movement with said one platen during the initial movement thereof from said second platen and including an auxiliary hydraulic lift.

9. In a belt-molding machine, a divided outer mold element adapted to receive the moldable material, formed interiorly with a plurality of circular grooves, and with a flash-receiving seat shaped to form a locking flashing, a cylindrical force plug formed on its exterior with a plurality of circular grooves adapted to mate with the grooves in said outer mold element to form the molded belt, means to expand said divided mold element laterally outwardly of said force plug to move said flash receiving seat away from said force plug to separate the molded belt from said force plug, and means to separate said expanded divided mold element and said force plug longitudinally of each other.

10. In a molding machine, a first mold element formed of movable parts, a second mold element cooperating with said first mold element to form the article to be molded, a flash receiving seat on said movable parts to receive the flash of the molded article, and means to move said movable parts laterally of said second mold element, said flash receiving seat moving with said laterally moving parts to exert a force on the molded flash to separate the molded article from said second mold element.

11. In a molding machine, a first mold element formed of movable parts, a second mold element cooperating with said first mold element to form the article to be molded, a flash receiving seat on said movable parts to receive the flash of the molded article, means to move said parts laterally of said second mold element, said flash receiving seat moving with said laterally moving parts to exert a force on the molded flash to separate the molded article from said second mold element, and means to separate said mold elements longitudinally of each other after said lateral movement of said parts to completely remove said second mold element from the molded article.

12. In a molding machine, a first mold element formed of movable parts, a second mold element cooperating with said first mold element to form the article to be molded, a flash receiving seat on said parts to receive the flash of the molded article, and cooperating cam means to move said parts laterally of said second mold element to separate the molded article from said parts, said flash receiving seat moving with said laterally moving parts to exert a force on the molded flash to separate the molded article from said second mold element.

13. In a molding machine, a first mold element formed of movable parts, a second mold element cooperating with said first mold element to form the article to be molded, a flash receiving seat on said parts to receive the flash of the molded article, means to move said parts laterally of said second mold element to separate the molded article from said parts, said flash receiving seat moving with said laterally moving parts to exert a force on the molded flash to separate the molded article from said second mold element, means to separate said mold elements longitudinally of each other after said lateral movement of said parts to completely remove said second mold element from the molded article, and means to inject a lubricant upon the molded article during said longitudinal separation.

KENNETH O. TOOKER.